United States Patent [19]

Shiau et al.

[11] Patent Number: 5,700,587
[45] Date of Patent: Dec. 23, 1997

US005700587A

[54] RESORCINOL-GLUTARALDEHYDE RESIN AS AN ACCELERATOR FOR CURING PHENOL-FORMALDEHYDE RESINS

[75] Inventors: David Wen-I Shiau; William David Detlefsen, both of Eugene; Earl Kay Phillips, Springfield, all of Oreg.

[73] Assignee: Borden Chemical, Inc., Columbus, Ohio

[21] Appl. No.: 422,318

[22] Filed: Apr. 13, 1995

Related U.S. Application Data

[62] Division of Ser. No. 269,111, Jun. 30, 1994, Pat. No. 5,446,089, which is a division of Ser. No. 991,208, Dec. 15, 1992, Pat. No. 5,364,902.

[51] Int. Cl.$^6$ ............................................. B32B 21/08
[52] U.S. Cl. ....................... 428/528; 428/537.1; 156/335
[58] Field of Search ............................. 428/528, 537.1; 156/335

[56] References Cited

U.S. PATENT DOCUMENTS

| | | | |
|---|---|---|---|
| 3,328,354 | 6/1967 | Dietrick | 260/54 |
| 3,389,125 | 6/1968 | Dietrick et al. | 260/54 |
| 3,437,610 | 4/1969 | Moult | 524/596 |
| 3,929,695 | 12/1975 | Murata et al. | 525/480 |
| 4,089,837 | 5/1978 | Luttinger et al. | 260/38 |
| 4,200,706 | 4/1980 | Starks | 525/502 |
| 4,314,050 | 2/1982 | Grigis | 524/596 |
| 4,373,062 | 2/1983 | Brown | 524/841 |
| 4,389,320 | 6/1983 | Clampitt | 252/8.55 R |
| 4,395,521 | 7/1983 | Chow et al. | 525/502 |
| 4,426,484 | 1/1984 | Saeki et al. | 524/541 |
| 4,588,761 | 5/1986 | Thorne et al. | 524/500 X |
| 4,862,948 | 9/1989 | Laitar | 525/480 X |
| 4,904,516 | 2/1990 | Creamer | 525/480 X |
| 5,292,333 | 3/1994 | Johnson | 606/214 |

FOREIGN PATENT DOCUMENTS 0069444  6/1977  Japan.

OTHER PUBLICATIONS

Knop and Pilato, "Phenolic Resins", published by Springer-Verlag 1985; Preface and pp. XII-Xii, 5, 6, 13-15, 307-313.

*Primary Examiner*—Judy M. Reddick
*Attorney, Agent, or Firm*—Roylance, Abrams, Berdo & Goodman, L.L.P.

[57] ABSTRACT

The invention relates to the use of a resorcinol-glutaraldehyde reaction product as an accelerator for thermosetting phenolic resin and to a method of making the accelerator. Further, the invention relates to a resin blend comprising phenol-formaldehyde and the accelerator and a process for making cellulosic board, oriented strandboard and plywood wherein the binder for the cellulosic board, oriented strandboard and plywood in its uncured form comprises the resin blend of the invention. In another embodiment the accelerator for thermosetting resin comprises resorcinol and glutaraldehyde.

9 Claims, No Drawings

RESORCINOL-GLUTARALDEHYDE RESIN AS AN ACCELERATOR FOR CURING PHENOL-FORMALDEHYDE RESINS

This is a division of application Ser. No. 08/269,111 filed Jun. 30, 1994 now U.S. Pat. No. 5,446,089 which is a divisional of Ser. No. 07/991,208 filed Dec. 15, 1992 issued Nov. 15, 1994 to U.S. Pat. No. 5,364,902.

FIELD OF THE INVENTION

This invention relates to an improved phenolic resin that is useful as an adhesive binder for the manufacture of hot pressed wood composites such as hardboard, fiberboard, strandboard, wood panels, particleboard, plywood, and the like.

BACKGROUND OF THE INVENTION

Phenolic resins for the wood industry have been refined for the past twenty years to the current "state of the art" and as such, perform to a well defined standard. The recent development of isocyanate-based adhesives has provided wood adhesives that are somewhat faster curing than phenolics and that are, in some cases, replacing phenolics due to their faster cure rates, even though they have some negative health and economic aspects.

However, phenol-formaldehyde resins remain widely used as adhesives and binders in many wood products, including wood products such as plywood, particleboard, fiberboard, hardboard and oriented strandboard. The productivity of most mills manufacturing wood products using liquid phenol-formaldehyde resole (PF) binders is limited by the cure speed of the binder in the hot press. This is because of the inherently slow thermal cure of these products, compared to other commonly used binders, and because of the need to eliminate moisture from the system during curing.

Several methods have been used to speed up the cure rate of PF resin binders.

There are the methods in which various kinds of alkali metal hydroxides, water-soluble alkali metal weak acid salts, or water-insoluble multivalent metal carbonates are added to the PF resin in order to accelerate its curing.

In order to speed up the cure rate (i.e, cut down the cure time), curing agents like alkylene carbonate have been utilized. U.S. Pat. No. 4,961,795 to Detlefsen et al describes such a curing agent. Unfortunately, mixing this type of curing agent with a phenol-formaldehyde resin usually results in a mixture that has a very limited "pot life" for process manipulation.

It was the intention of the inventors to develop an additive that will accelerate the curing of phenol-formaldehyde resin and provide a synergistic effect by improving bond quality of the manufactured wood products bonded with the resin. Further, it was the intention of the inventors that binder made by mixing the additive with the phenol-formaldehyde resin have a reasonable "pot life."

SUMMARY OF THE INVENTION

It has been discovered that the addition of small amounts of resorcinol-glutaraldehyde reaction product to phenol-formaldehyde resin will accelerate subsequent heat cure of the resin. The resorcinol-glutaraldehyde (RGL) is preferably in resin form.

However, generation of the RGL reaction product to serve as an accelerator for curing PF resin, can be done in situ by the direct mixing of a PF resin with appropriate amounts of resorcinol and gultaraldehyde prior to spraying the binder onto wood products or the like. Further, the resorcinol-glutaraldehyde resin of the invention has adhesive qualities that allow it to be used "as is" or in combination with other suitable resins to bind cellulosic components and the like.

In one embodiment, the invention is a blend of phenol-formaldehyde resin and resorcinol-glutaraldehyde resin. In another embodiment the invention is an adhesive composition made by adding components with desired properties to the accelerated blend of the invention. The added components may include for instance fillers such as wood flour or the like. Further, the invention relates to hot pressed wood composites made using the inventive adhesive.

According to one embodiment of the invention, the accelerator is prepared by allowing glutaraldehyde to react with resorcinol to produce a resorcinol-glutaraldehyde resin using a molar ratio of glutaraldehyde to resorcinol in the range from about 0.5:1 to about 2.5:1. Resin blends of the invention may contain about 1 to about 25 parts of resorcinol-glutaraldehyde resin and about 99 to about 75 parts of an aqueous solution of an alkaline phenol-formaldehyde resole resin having solids content of at least about 40% by weight. The blends are useful as binders in the manufacture of wood panels using a conventional spraying, hot-pressing process. Strandboards produced according to the invention had stronger bond strength and better durability achieved at relatively shorter press cycles, than the control strandboard in which the adhesive was a conventional PF resole resin, without an accelerator additive.

In another embodiment, the invention relates to cellulosic board and to a process for making cellulosic board wherein the binder for the cellulosic board in its uncured form comprises a resin blend according to the invention. Further, the invention relates to oriented strandboard and to a process for making the strandboard wherein the binder for the strandboard in its uncured form comprises a PF resin blended with an accelerator additive, according to the invention. Further, the invention relates to plywood and to a process for making the plywood wherein the binder for the plies of the plywood in its uncured form comprises a resin PF blended with an accelerator additive according to the invention.

In further embodiments, the invention relates to binders consisting essentially of RGL resins, formulated adhesive binders that comprise RGL resins and to cellulosic products that contain any of these binders.

DETAILED DESCRIPTION OF THE INVENTION

The present invention relates to the use of a mixture or blend of an accelerator and a PF resin, referred to herein as an accelerated PF resin, for the bonding of lignocellulosic materials such as in the manufacture of plywood, hardboard, particleboard, fiberboard, oriented strandboard and the like. Phenol-formaldehyde resole resins are conventionally utilized in the manufacture of structural wood product, i.e., for the bonding of lignocellulosic materials. The phenol-formaldehyde resin may be used as is or may be extended by mixing the resin with flour or other suitable fillers. The as is PF resins are typically used for composition panels while the extended resins are used for plywood.

Process For Preparation of the Accelerator

The accelerator of the invention, resorcinol-glutaraldehyde resin, is prepared by allowing glutaraldehyde to react with resorcinol.

Typically, a 25% glutaraldehyde aqueous solution is first concentrated at 52° C.±4° C. to raise its concentration to 30% to 40%. The pH of the 25% glutaraldehyde solution from the supplier is generally no more than about 3 but could be lower depending on its age, etc. During the process of raising the concentration of the initial glutaraldehyde solution, the pH can be adjusted to be in the range from about pH 3 to about pH 10.3. Bases such as soda ash, caustic soda, potassium hydroxide, triethanolamine, and their mixtures, may be used to adjust the pH. The specific base used is not critical as long as the pH is controlled. The glutaraldehyde concentration is not necessarily limited to a range of 30% and 40%; other concentrations can also be used.

Resorcinol is then introduced to react with the glutaraldehyde. The molar ratio of glutaraldehyde to resorcinol may be varied from 0.5:1 to 2.5:1. Resorcinol can be added in one full charge or in several separate incremental charges at different reaction stages. The use of 2 or 3 separate incremental additions of resorcinol is preferred. The pH of the reaction mixture usually should range from 5.5 to 8.5, and is preferably in the range of 6.0 to 7.5. The pH ranges are convenient for control of the reaction, but are not critical.

The reaction can be carried out from room temperature to reflux with the preferred range being between 60° C. and 80° C. This preferred temperature range here is for convenience in the control of the reaction. The resinous reaction product will generally have a non-volatile content of 40% to 60%, with 45% to 50% as the preferred range, and will have a pH of 5.0 to 7.5. The pH range is determined by storage requirements.

The Phenolic Resin

Phenolic resins that can be used in the present invention are water-soluble thermosetting condensation products which are made by reacting one or a mixture of hydroxy aromatic compounds (phenols) with one a mixture of aldehydes using an alkaline catalyst.

Phenols used generally are phenol, cresol, and other substituted phenols. Substituted phenols employed in the formulation of the phenolic resins include: alkyl substituted phenols, aryl-substituted phenols, cycloalkyl-substituted phenols, alkenyl-substituted phenols, alkoxy-substituted phenols, aryloxy-substituted phenols and halogen-substituted phenols, the foregoing substitutents containing from 1 to 26 and preferably from 1 to 6 carbon atoms. Specific examples of suitable phenols, aside from the preferred unsubstituted phenol, incude: m-cresol, p-cresol, 3.5-xylenol, 3.4-xylenol, 2.3.4-trimethyl phenol, 3-ethyl phenol, 3.5 diethyl phenol, p-butyl phenol, 3.5-dibutyl phenol, p-amyl phenol, p-cyclohexyl phenol, p-octyl phenol, 3.5 dicyclohexyl phenol, p-phynyl phenol, p-crotyl phenol, 3.5-dimethoxy phenol, 3.4.5-trimethoxy phenol, p-ethoxy phenol, p-butoxy phenol, 3-methyl-4-methoxy phenol and p-phenoxy phenol.

The aldehydes reacted with the phenol can incude any of the aldehydes heretofore employed in the formation of phenolic resins such as formaldehyde, acetaldehyde, propionaldehyde, furfuraldehyde and benzaldehyde. In general, the aldehydes employed have the formula R'CHO wherein R' is a hydrogen or a hydrocarbon radical of 1 to 8 carbon atoms. The most preferred aldehyde is formaldehyde. There are included in aldehyde substances that may be reacted with the phenol formaldehyde sources or donors such as formalin, para-formaldehyde, alpha-polyoxymethylene, hexamethylene tetramine, etc.

Caustic soda is the most suitable practical alkaline catalyst, but caustic potash, barium hydroxide, mixtures of these, basic alkaline salts such as alkali metal carbonate, and mixtures of such salts with one or more of these hydroxides, can also be included. As the aqueous solvent, water is the most suitable, but mixed solvents which consist of water and water-soluble lower alcohols, water and other water-soluble organic solvents are included. These aqueous solvents are used with solid contents of such phenolic resins, being between about 30% and 60%, preferably between about 35% and 50%, and more preferably at least about 40% solids by weight.

The molar ratio of phenol to aldehyde for the preparation of water-soluble thermosetting phenolic resins used in the present invention is generally from about 1:1.5 to 1:3, preferably from about 1:1.7 to 1:2.5, and these are reacted with an alkaline catalyst in an aqueous solvent. It is preferable for the water-soluble phenolic resin for use in the present invention to be stable for long term storage, therefore such a water-soluble phenolic resin is reacted until its free formaldehyde content becomes less than three percent by weight, preferably less than one percent by weight, and more preferably less than 0.2%.

Descriptions of procedures that may be used to make suitable phenolic resins are found in the pages of Chapter 5 of *Phenolic Resins* by Knop and Pilato published in 1985 by Springer-Verlag, which pages are expressly incorporated herein by reference.

Adhesive Binder Composition of the Invention

The adhesive binder composition or resin blend of the invention comprises a mixture of about 1 to about 25 parts of the resorcinol-glutaraldehyde resin solution (RGL) with about 99 to about 75 parts of a phenol-formaldehyde resole resin solution, with the solids content of the RGL solution being 40% to 60%, and with the solids content of the resole solution being 40% to 60%.

The blending of the accelerator and the phenolic resin can be accomplished by any suitable means. For instance, the accelerator may be mixed into a batch of phenolic resin, or mixing can take place by merging separate streams of each of the resins.

If desirable, other components such as filler and/or extender may be added to the phenol-formaldehyde resin before it is mixed with the accelerator or the components may be added at any other suitable stage. Application of the final adhesive binder system to the furnish may be done by any conventional method such as spraying, brushing, roller coating, or curtain coating.

The resin blend of the invention can be used to make a variety of lignocellulostic products. Methods for making plywood, cellulosic board, oriented strandboard and the like are described in prior art as for instance in U.S. Pat. Nos. 4,758,478 to Daisy et al, and 4,961,795 to Detlefsen et al., which patents are incorporated herein by reference. For example when producing a composition panel such as particle board or oriented strandboard by a mat process, wood flakes, fibers or particles are sprayed with a solution of accelerated resin of the invention. The sprayed pieces of wood may be passed through a forming head to make a mat. Alternatively, multiple forming heads may be employed to lay down successive layers of a multiple layer product. In such a case, it is feasible to spray the wood particles as they are being fed to each forming head with its own supply of resin formulation. Hot pressing conditions for the mat will depend upon the target thickness for the board product as well as on the characteristics of the binder.

It is contemplated that the inventive accelerated adhesive composition will be particularly useful in making plywood and its use may permit cutting down on hot press time and produce plywood with a stronger bond as compared with the use of ordinary phenol formaldehyde resins.

It is further contemplated that any thermosettable phenolic resin when combined with the accelerator of the invention will provide an adhesive that will require less heat energy in order to cure as compared to a control.

The invention will be demonstrated by the following examples. In these examples and elsewhere throughout the specification, parts and percentages are by weight and temperatures are degrees Celsius unless expressly indicated otherwise. The term "molar ratio" refers to the molar ratio of formaldehyde to phenol unless indicated otherwise.

EXAMPLES

General Comments

The 25% glutaraldehyde solution used in the examples was obtained from PFALTZ and BAUER, Inc. of Waterbury, Conn. It had a pH of about 3.2, and was a clear liquid characterized by a sharp odor. The resorcinol used was obtained from Koppers Company, Inc. of Pittsburgh, Pa. These resorcinol flakes had a minimum purity (dry basis) of 99.3%. The aspen strands used were obtained from the Potlatch Corporation of Cook, Minn. They consisted of strands of aspen, pine, birch, maple and oak and had moisture contents in the range of from 1% to 10%. The average strand size was targeted to be 0.03"×0.5"×1.75" (thickness/width/length).

The phenol-formaldehyde resin used was a commercial liquid phenol-formaldehyde resole resin obtained from the Borden Packaging & Industrial Products, Columbus, Ohio, sold under the trademark Cascophen PB-306. This resin had a pH of about 12.6 at 25° C., a free formaldehyde content of <0.2%, a free phenol content of <0.50%, a volatiles content of about 53% by weight at 125° C. and a solids content of about 47% by weight.

The viscosity of each of the samples described in the examples was measured using a Brookfield Synchro-Letric Viscometer Model: RVF-100, Volts: 115, Serial: 57787, Frequency: 60. Each sample was placed in a 400 mL beaker and its temperature was adjusted to 25° C. A #2 spindle was used and the speed was set at 20 rpm. The viscosity reading was taken at one minute from the time the motor was turned on.

Measurement of the Modulus of Rupture (MOR) was made as follows. A test specimen of 2"×14" was cut from each board. The specimen was weighed to ±0.1 gram and its thickness was measured to ±0.001 inch. The thickness measurement reported was an average of three different measurements, each taken at the center (i.e., 7" from each end of the specimen) and at the 3" center points from each end of the board. The span used was 8.0" and the load was applied at 0.5 inches/minute. The specimen was placed on the jig with ½ extending past one support and broken. The specimen was then turned over and was rebroken with ½ extending past the other support. Two breaks were measured on each MOR sample and the loads were recorded to ±0.1 lb. The MOR is reported as an average (psi) calculated according to the following formula:

$$MOR = \frac{3 \times (span) \times (load)}{2 \times (width) \times (thickness)^2}$$

A 6-cycle test was used to evaluate the delamination and strength retention of specimens of the product after six moisture cycles. It was conducted as follows. The specimen size was 2"×14" and each specimen was weathered per APA Test Method D-5 which is described as follows.

Specimens were placed in a rack such that they remained separated throughout testing to insure proper drying. The racks were then placed in a pressure vessel and completely submerged in 150° F. water. A vacuum of 15 inches of mercury was drawn, maintained for 30 minutes and released. Specimens were then allowed to soak in the same water at atmospheric pressure for 30 minutes with no additional heating. Afterwards they were removed and dried for six hours at 180° F. in an oven with fan-forced air circulation of 45 to 50 air changes per minute. Specimens were then returned to the pressure vessel and the vacuum-soak cycle was repeated. Following the second vacuum-soak cycle, specimens were again placed in the oven and dried for 15 hours at 180° F. This completed two cycles. This process was continued for two additional days until six cycles had been completed.

The conditioned specimens were then tested using the test used for the MOR measurement.

EXAMPLE 1

A. Preparation of Resorcinol-Glutaraldehyde Resin 1000 grams of the 24.88% glutaraldehyde aqueous solution (2.485 moles) were charged at room temperature to a 2 liter round-bottom flask and the pH of the solution was adjusted to 8.2 with 4.1 grams of anhydrous soda ash. The glutaraldehyde solution was then concentrated by distillation at a temperature of 47° C., under a vacuum of 27.1 inches of mercury, to give a yellow, milky product after 300 grams of distillate were removed.

182.4 grams (1.657 moles) of the resorcinol were charged to the flask when the batch temperature was of the concentrated glutaraldehyde solution 39° C. After dissolution, the clear yellow reaction mixture had a pH of 7.2 and was allowed to react at 75° C.±5° C. until its viscosity reached the letter G on the Gardner-Holt viscosity scale.

The reaction mixture was then cooled down to 40° C.±2° C., and then the cooled mixture was charged with an additional 59.7 grams (0.542 moles) of resorcinol. The product was a clear amber liquid, which had a pH of 6.3, a viscosity of 80 cps (at 25° C.) and a solids content of 51.4%.

B. Preparation of Two Phenol Formaldehyde Resin-Resorcinol Glutaraldehyde Resin Blends Resin blends for wood products manufacturing were prepared. A first resin blend B-1 was prepared by mixing 50 grams of the resorcinol-glutaraldehyde (RGL) resin of Step A with 950 grams of a commercial phenol-formaldehyde (PF) resole resin solution, Cascophen PB-306 resin from Borden. A second resin blend B-2 was made by mixing 100 grams of the RGL resin of Step A with 900 grams of the same PF resole resin solution.

C. Making of Aspen Strandboards 6851 grams of aspen strands having a moisture content of 3.8% were placed in a rotating drum blender and were sprayed with 698 grams of the first resin blend B-1. Next, 1780 grams of the resin-treated strands were taken from the drum blender and spread evenly in a 14.75"×14.75" mold to form a mat. The mat was then hot pressed at 400° F. for an amount of time in the range of from 4 to 6 minutes to produce a strandboard specimen with a target thickness of about 0.75". This was repeated to produce several specimens, using different press times.

Similarly, other strandboard specimens were produced in generally the same way as just described, but using 695 grams of the second resin blend B-2 instead of using the first resin blend B-1. Several control strandboard specimens were likewise made by spraying aspen strands with 701 grams of the commercial PF resin instead of using resin blends B-1 or B-2.

The bond strength of each strandboard specimen was then measured, and the results are tabulated in Table 1.

TABLE 1

Summary of the Averaged Bond Data

| Resin Binder | Press Cycle Time (min) | Internal Bond Strength (psi) | Modulus of Rupture (psi) | Modulus of Rupture After 6-cycle Test (psi) |
|---|---|---|---|---|
| PF | 6.00 | 66 | 3203 | 2017 |
| Control | 5.50 | 59 | 3583 | 1804 |
|  | 5.00 | 45 | 3087 | 1581 |
|  | 4.75 | 44 | 2213 | 1687 |
| Resin Blend B-1, | 5.50 | 66 | 3971 | 1999 |
| Ratio of 5 Parts | 5.00 | 51 | 3972 | 2291 |
| RGL to 95 | 4.50 | 49 | 3230 | 2126 |
| Parts PF | 4.00 | 45 | 2562 | 1516 |
| Resin Blend B-2 | 5.50 | 65 | 4158 | 2504 |
| Ratio of 10 Parts | 5.00 | 66 | 4117 | 2590 |
| RGL to 90 | 4.50 | 56 | 3859 | 2874 |
| Parts PF | 4.00 | 49 | 3482 | 2082 |

Conclusions

The bond strength data shown in Table 1 demonstrate the accelerating effect that the resorcinol-glutaraldehyde resin has on the phenol-formaldehyde resin cure speed and the improved bond quality of the wood products. The results observed when using Resin Blend B-2 are particularly dramatic with respect to the MOR values.

The minimum press cycle time shown in Table 1 for each resin binder was the shortest cycle which did not show delamination upon pressure release. For instance, acceptable PF control strandboard (i.e one that did not delaminate upon pressure release) required a press time of at least 4.75 minutes, whereas acceptable strandboards were made with the first resin blend B-1 and with the second resin blend B-2 using a press time of only 4.00 minutes. These data demonstrate that acceptable strandboard can be made more quickly and can be made using less energy than is the case with the control strandboard.

Further, the data show the acceptable strandboard of the invention can not only be made quicker and with less energy but also that the strandboard of the invention has a greater bond strength and a higher modulus of rupture than control strandboard, when the least press time is used that avoids delamination upon the release of pressure.

EXAMPLE 2

A. Preparation of Resorcinol-Glutaraldehyde Resin 1000 grams of the 24.88% glutaraldehyde solution (2.4850 moles) were charged at room temperature to a 2-liter round-bottom flask and the pH of the solution was adjusted to 8.13 with 3.5 grams of anhydrous soda ash. The glutaraldehyde solution was then concentrated by distillation at a temperature of 48° C.–49° C. and under a vacuum of 27 inches of mercury to give a yellow, milky product after 300 grams of distillate were removed.

182.4 grams (1.657 moles) of resorcinol were charged to the flask when the batch temperature was 39° C. After dissolution, the clear and yellow reaction mixture had a pH of 7.07 and was allowed to react at 75° C.±5° C. until its viscosity reached the letter G of the Gardner-Holt viscosity scale.

The reaction mixture was then cooled down to 40° C.±2° C. and then the cooled mixture was charged with an additional 59.7 grams (0.5422 moles) of resorcinol. The product was a clear amber liquid which had a pH of 6.08, a viscosity of 74 cps (at 25° C.), and a solids content of 50.77%.

B. Preparation of Two Phenol Formaldehyde Resin-Resorcinol Glutaraldehyde Resin Blends Resin blends for wood products manufacturing were prepared. A resin blend B-3 was prepared by mixing 100 grams of the resorcinol-glutaraldehyde (RGL) resin of Step A with 900 grams of a commercial phenol-formaldehyde (PF) resole resin solution, Cascophen PB-306 resin from Borden. Another resin blend B-4 was prepared by mixing 150 grams of the RGL resin of Step A with 850 grams of the PF resole resin solution.

C. Making of Aspen Strandboards 6809 grams of aspen strands having a moisture content of 2.7% were placed in a rotating drum blender and were sprayed with 713 grams of resin blend B-3. Next, 1766 grams of resin-treated strands were taken from the drum blender and spread evenly in a 14.75"×14.75" mold to form a mat. The mat was then hot pressed at 400° F. for an amount of time in the range from 3.75 to 6.00 minutes to produce a strandboard specimen with a target thickness of 0.75". This process was repeated to produce several specimens, using different press times.

Similarly, strandboards were produced in generally the same way as just described, but using resin blend B-4 instead of resin blend B-3. Several control strandboard specimens were likewise made by spraying aspen strands with 720 grams of the PF resin instead of using resin blends B-3 or B-4.

The bond strength of each strandboard specimen was measured, and results tabulated in Table 2.

TABLE 2

Summary of the Averaged Bond Data

| Resin Binder | Press Cycle Time (min) | Internal Bond Strength (psi) | Modulus of Rupture (psi) | Modulus of Rupture After 6-cycle Test (psi) |
|---|---|---|---|---|
| PF | 6.00 | 56 | 4090 | 1816 |
| Control | 5.50 | 57 | 3646 | 2182 |
|  | 5.00 | 48 | 3504 | 2003 |
|  | 4.50 | 49 | 3675 | 2133 |
| Resin Blend B-4 | 5.50 | 64 | 3975 | 2106 |
| of 15 Parts | 5.00 | 51 | 3773 | 2085 |
| RGL & 85 | 4.50 | 51 | 3911 | 2099 |
| Parts PF | 4.00 | 45 | 3243 | 2240 |
| Resin Blend B-3 | 5.00 | 57 | 3756 | 2219 |
| of 10 Parts | 4.50 | 56 | 3781 | 2214 |
| RGL & 90 | 4.00 | 49 | 3280 | 2226 |
| Parts PF | 3.75 | 40 | 3657 | 2100 |

Conclusions

This set of data reaffirms the accelerating effect of the added resorcinol-glutaraldehyde resin on phenol-formaldehyde resin cure. Once again, the minimum press cycle time shown in Table 2 for each resin binder was the shortest cycle which did not show delamination upon pressure release.

The data indicate that the bonding strength of a PF resin adhesive is enhanced by the addition of resorcinol-glutaraldehyde resin. The data suggest that there may be an optimum amount of RGL for any given PF resin.

GENERAL

The formulation of the phenol-formaldehyde resin depends to some extent on the end use for which it is intended and the formulation in turn affects the curing behavior of the resin and thus the result obtained from the curing agent and the accelerator (RGL). The formulations typically used for composition panel such as oriented strandboard have a solids content of between about 50 and 60 weight percent and are free of any extender or filler. On the other hand, the formulations typically used for plywood are cooked to a solids content of between about 40 and 48 weight percent and then combined with a filler or extender such as wheat flour or the solid by-product obtained from the production of furfural alcohol from corn cobs.

The accelerated resin of the invention can be applied to the furnish with any form of conventional equipment currently in use. Such equipment includes spray nozzles, atomizing wheels, roll coaters, curtain coaters and foam applicators. The key to successful use, however lies in obtaining a relatively short time interval between mixing of the accelerator and the resin and application of the mixture to the furnish. This is because the viscosity of prior art accelerated resin begins to increase and may result in loss of solubility in water after mixing. However, the accelerated resins of the invention are quite stable for several hours to several days and are suitable for use in existing equipment.

When neat resins are mixed with prior art accelerator, as for an oriented strandboard application, the mixture is usually too thick to handle within 30–60 minutes or less. The exact time depends upon the nature of the resin, the nature of the accelerator, and the proportions of the two components. When dealing with filled adhesives, as for plywood, more pot life is available than with unfilled resins, usually about 60–180 minutes. This is true both because the filled adhesives, normally mixtures of resin, water, sodium hydroxide and fillers or extenders, do not increase as rapidly in viscosity as the neat resins, and because plywood application equipment can handle higher viscosities. Despite the greater pot life of the plywood mixes, the rapid viscosity increase obtained when mixed in normal mixing equipment, i.e., glue mixer and glue storage tank, would be considered limiting. For these reasons, in-line mixing just prior to application to the furnish is the preferred means of introducing the accelerator. In-line mixing is particularly advantageous in the use of the accelerator with unfilled phenolic resin and greatly facilitates use of the agent with filled resins.

Although there is no reason why the resins of the invention cannot be in-line mixed, the longer "pot life" of the resins of the invention allows the manufacturer to use more conventional mixing and glue storage equipment.

The choice of raw material for the cellulosic component is based mainly on availability and cost. As is common in boardmaking manufacturing operations, the wood from which particles are produced may be in the form of logs that are unsuitable for conversion into lumber or plywood because they are too small, too crooked or too knotty, or the like. When such logs are reduced to small particle form, defects are screened out.

The invention is useful in the production of board that is made from homogeneous cellulose material or from mixtures of different kinds of such material. A board may be made, for example, completely from wood particles, or completely from wood flakes, or from fibers, planer shavings or the like, or from mixtures of these. Similarly, a board may be formed with multiple layers, with fine surface flakes and a core of coarse flakes, or it may have a coarse-flaked core with an overlay of fibers on each of its surfaces. Other combinations may also be produced.

Wood flakes are generally made by a machine that shaves off flakes of the wood in a direction such that the length of each flake is parallel to the wood grain. A normal size flake has dimensions such as ¼ by 1", with a thickness in the range from about 0.005" to about 0.075", depending upon the intended end use.

The cellulosic material may also be in the form of wood fibers. In the production of such fibers, wood chips are generally mechanically reduced to fiber form in an attrition mill.

The wood pieces employed in making the composite panel have some affinity for water and a tendency to absorb it. Water entering a composite panel tends to weaken it, may cause some swelling of surface fibers, and increases the dimensional instability of the composition panel. To prevent this tendency to absorb water, a wax may be applied to the wood pieces to provide a built-in resistance in the composition panel to water absorption. The wax employed may be any wax that will suffice, for example, a crude scale wax or a microcrystalline wax. It is applied, generally, at a rate of from about 10% by weight to about 30% by weight of the binder, and preferably about 20% by weight, dry solids basis. When expressed in terms of oven-dried furnish solids, the amount of wax is from about 0.3% by weight to about 3.0% by weight of wax to wood.

The amount of accelerated phenol-formaldehyde resin used generally will depend upon the characteristics required in the final product. For a high grade oriented strandboard, the amount of binder used may be up to about 5% of resin solids based on dry finished board weight and generally may be from about 2% to about 4%. For a good grade of particleboard, the amount of resin should be sufficient to provide from about 3% to about 8% dry resin solids based on the weight of the furnish for the composite panel. In a multi-layered board, a lesser amount of resin will often be used in the core than is used for the surface layers.

Hot pressing conditions will depend upon the thickness of the board as well as on the characteristics of the accelerated resin. A representative press cycle for the production of a ¾" thick bonded particleboard would be about 6.5–7 minutes at a press platen temperature of about 380°–420° F. The pressing time can be reduced by the present invention without loss in board quality. For instance ¾ inch five layer oriented strandboard typically requires a pressing time of 540 seconds. The use of about 5 weight percent of an accelerator RGL resin, in accordance with the invention, allows reduction of the press time without loss of final board properties.

The invention is also useful in the manufacture of plywood, a board composed of multiple layers of wood veneers. The veneers are usually arranged so that the wood grain direction is perpendicular in adjacent veneers.

The plywood process requires straight logs cut to length, and conditioned in heated vats containing water and surfactants to increase the heating efficiency of the vats. The heated logs are then "peeled" wherein a veneer of predetermined thickness is removed continuously until the log diameter is reduced to a certain point, usually 5–8 inches. The veneer is then clipped into strips, sorted and dried to a moisture content of 15% or less.

After drying, the veneers are graded and assembled into plywood panels, the adhesive binder is applied to the veneers at this stage of manufacture.

After the adhesive is applied to the wood veneers and the panels are assembled, they are consolidated under heat and pressure. This is usually done in a steam hot press using platen temperatures of 240°–350° F. and pressures of 74–250 psi.

In producing plywood, the most critical glueline is the innermost one. This glueline is the most difficult to cure under present conditions. That is, often the innermost glueline is not fully cured when the other gluelines are. It is necessary, then, to apply additional hot pressing to the board to cure this glueline. One additional use of the present invention is that the accelerated resin can be applied to the innermost gluelines. The accelerated resin is then able to provide a complete cure at the innermost glueline in the same time period as it takes to cure the other gluelines.

It has been discovered that several advantages are obtained by utilizing an accelerated resin, i.e., a resin containing the curing agent, in the manufacture of structural wood products. One advantage is that cure time can be decreased. A second advantage is that the addition of the curing agent increases the tolerance to moisture in the system. It is contemplated that the system may withstand more moisture with the accelerated resins, and make possible the production of more premium-grade panels. It is contemplated that the thicker the board, the more effective the accelerator, and the more significant the advantages.

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

We claim:

1. A process for the production of cellulosic board materials by bonding cellulosic components under heat and pressure, comprising
   (a) applying to separate cellulosic components an effective amount of a binder therefor comprising in admixture an alkaline phenolic resole resin solution having a solids content of at least 40% by weight and a resorcinol-glutaraldehyde resin; and
   (b) subjecting said cellulosic components, to which said binder has been applied, to heat and pressure to cure said binder and to unite said components in board form.
2. A cellulosic board produced by the process of claim 1.

3. A process for the production of oriented strandboard by bonding oriented wood strands under heat and pressure using an adhesive binder, comprising
   (a) spraying said wood strands with an adhesive binder therefor that is curable upon the application of heat and that comprises an alkaline phenolic resole resin solution and resorcinol glutaraldehyde resin;
   (b) forming the sprayed strands into an oriented mat; and
   (c) subjecting said mat to heat and pressure to cute said resin and to unite said oriented strands to form board.
4. An oriented strand board produced by the process of claim 3.
5. A process for the production of plywood by bonding together with an adhesive resin binder that is curable under heat and pressure, at least two plies having a layer of the adhesive resin binder between them, comprising
   (a) spraying at least one surface of at least one ply with an adhesive resin binder therefor that is curable upon the application of heat, which binder comprises an alkaline phenolic resole resin solution and resorcinol-glutaraldehyde resin;
   (b) juxtaposing the ply to which said adhesive binder has been applied with another ply, with said adhesive binder therebetween, and then
   (c) subjecting said juxtaposed plies to heat and pressure to cure said binder and unite said plies to form plywood.
6. Plywood made according to the process of claim 5.
7. A cellulosic board formed under heat and pressure from separate cellulosic components bound together by an adhesive binder cured under applied heat and pressure, wherein said binder in its uncured form comprises an aqueous resin blend comprising an alkaline phenol-formaldehyde resole and an accelerator wherein said accelerator comprises a resorcinol-glutaraldehyde reaction product.
8. A process for making a product by bonding cellulosic components under heat and pressure comprising
   (a) applying to separate cellulosic components an effective amount of a binder wherein said binder comprises (1) an alkaline phenolic resin solution having a resin solids content of at least 40% by weight and (2) an amount of resorcinol glutaraldehyde resin; and
   (b) subjecting said cellulosic components to heat and pressure to cure said binder and to unite said components.
9. The product made by the process of claim 8.

* * * * *